United States Patent Office 2,961,692
Patented Nov. 29, 1960

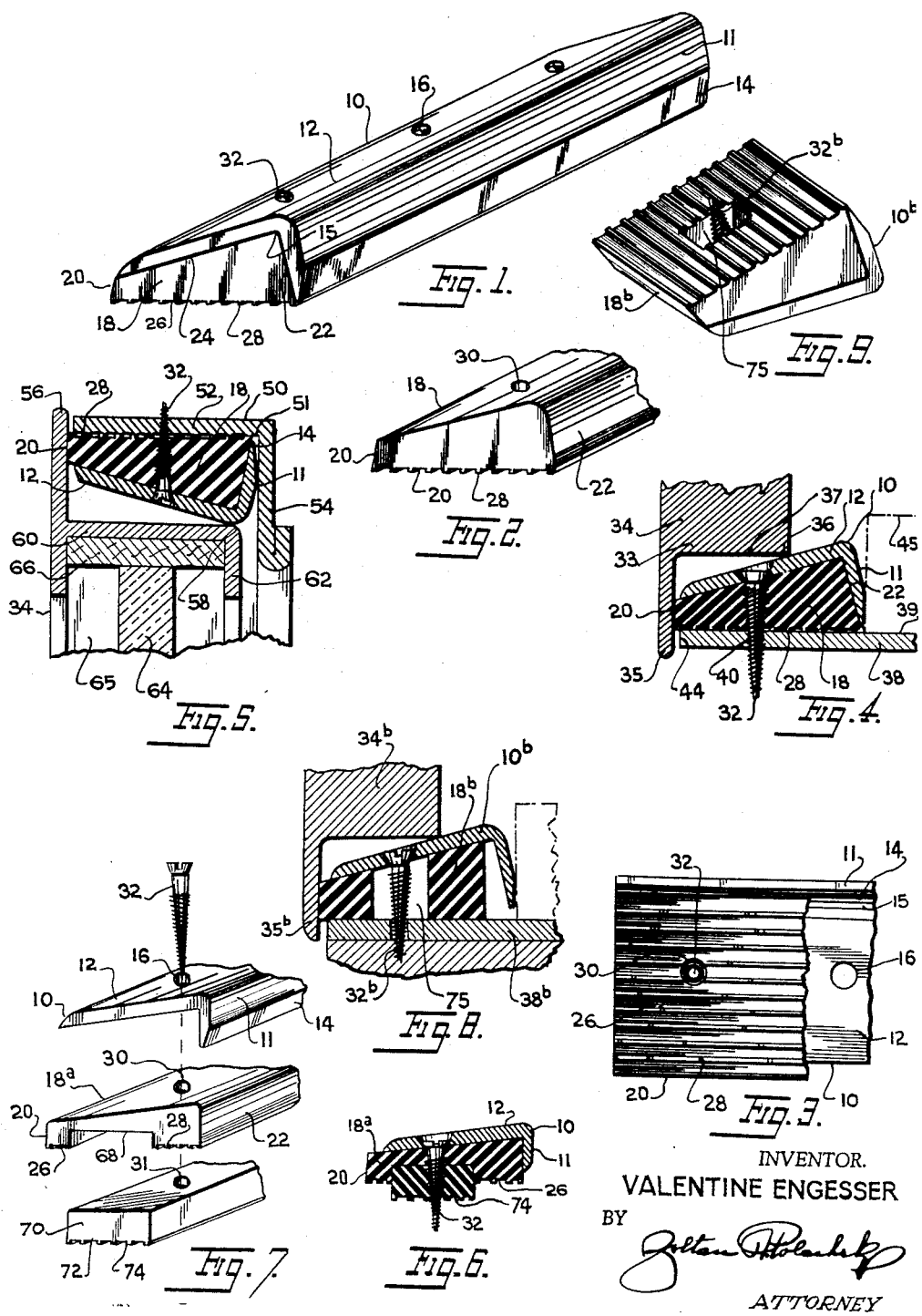

2,961,692
VIBRATION DAMPER FOR AUTOMOBILE DOORS

Valentine Engesser, Queens Village, N.Y., assignor to Marie Aicheler, Richmond Hill, N.Y.

Filed June 23, 1958, Ser. No. 743,942

2 Claims. (Cl. 16—86)

This invention concerns a vibration damper for a door of an automobile, truck or other vehicle.

In automobiles, a particular difficulty is encountered with doors which rattle and shake while the vehicles are in motion. One source of this objectionable vibration is located at the bottom and top edges where projecting flanges of a door contact portions of the door frame.

Attempts have been made to reduce this vibration by lining the door frame with rubber or felt strips. This has not proven wholly satisfactory because the strips wear rapidly or are torn loose by the rather severe forces to which they are subjected such as when a door is slammed closed, etc.

According to the present invention, there is provided a new and improved door frame molding strip which serves as a vibration damper for the purpose of preventing objectionable rattling of the door of a vehicle.

A further object of the invention is to provide a metal rail or molding which is formed to receive a resilient pad or cushion.

A still further object is to provide a molding with a resilient pad shaped to define an elongated wedge which acts as a shock absorber and vibration damper.

Another object is to provide a door molding with a resilient pad having a recess for receiving auxiliary cushions.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a molding embodying the invention.

Fig. 2 is a perspective view of a portion of a resilient pad according to the invention.

Fig. 3 is a bottom plan view of a portion of the molding of Fig. 1.

Fig. 4 is a sectional view of a portion of a door and door frame of a vehicle equipped with the molding of Figs. 1 and 3.

Fig. 5 is a sectional view of another portion of a door and door frame of a vehicle equipped with the molding of Fig. 1.

Fig. 6 is a sectional view of a vibration damper embodying another form of the invention.

Fig. 7 is an exploded perspective view of the component parts of the form of invention shown in Fig. 6.

Fig. 8 is a view similar to Fig. 6 of a vibration damper embodying a further modified form of the invention.

Fig. 9 is a fragmentary bottom perspective view of the damper shown in Fig. 8.

Referring to the drawing, there is shown in Figs. 1, 3, 4 and 5, a metal molding 10 which has a general L-shaped cross section with a rear side or wall 11 and a broad flat top side or wall 12. Walls 11 and 12 are integrally formed in the molding and have a rounded inside corner filet 15. Wall 11 has an inwardly tapered margin or edge 14 on its outer side. A plurality of longitudinally spaced countersunk holes 16 are provided in wall 12.

Snugly disposed within the molding 10 is a pad 18 best shown in Fig. 2. This pad is formed of a resilient material such as natural or synthetic rubber or an elastomeric material such as neoprene. The pad is generally wedge shaped. It has a narrow edge 20 and oppositely disposed wide edge 22. Top side or wall 24 is flat and disposed angularly to edges 20 and 22. The bottom side 26 is formed with longitudinally extending spaced, flexible ribs or corrugations 28 as best shown in Fig. 3. The transverse width of the pad is greater than the width of the inner side of wall 12 of the molding and the greatest thickness of the pad at edge 22 is greater than the width of the inner side of wall 11 of the molding. Thus, the pad extends in width and thickness beyond the edges of the molding 10. Holes 30 are countersunk in the pad to register with holes 16 in the molding. Through the registered holes are inserted flat head screws 32. The screws extend beyond the pad 18. The screws serve to secure the molding to portions of a door frame.

In Fig. 4, there is shown the bottom portion of a door 34 of a vehicle. The door has a lower flange 35 which extends beyond the inner body portion 33 and substantially perpendicularly thereto. This defines a substantially rectangular recess 37. The door has a corner 36 which may be slightly rounded. Plate 38 is part of the door frame, and may be integral with the running board or floor of the vehicle or other portion of the body. This plate has tapped holes 40 which receive the screws 32. The ribs 28 of the pad contact the flat upper side 39 of plate 38. The free edge 20 extends beyond the free edge 44 of the plate and abuts the inner side of flange 35.

When the door is closed in the position shown in Fig. 4, corner 36 presses down on the top of wall 12 and a wedging action is obtained so that the door is held against rattling and vibration when the vehicle is in motion. The contact of edge 20 against flange 35 also prevents vibration of the door so that objectionable rattling of the door against edge 44 is prevented. If the bottom of the door frame is formed with a threshold ledge as indicated by dotted line 45 in Fig. 4, this ledge will serve as a back or inner seat for the molding.

Fig. 5 shows another arrangement for the molding structure in which the vibration damper and shock absorber is seated at the top of a door frame 50 in a right-angled recess 51 formed by upper wall 52 and rear or inner wall 54 of the door frame. Upper flange 56 of the door 34 abuts edge 20 of pad 18. Ribs 28 are pressed against the lower side of wall 52 and wall 11 of the molding is juxtaposed to the inner side of wall 54. The molding provides a wedge at the top of the door to cushion it against vibration and to serve as a shock absorber thereat. Screws 32 are seated in tapped holes in wall 52. The corner 58 formed by the top wall 60 and inner flange 62 of the door contacts the outer side of wall 12 of the molding, as clearly shown in Fig. 5. The door 34 is provided with the usual retractable window 64 slidable between channels formed in felt or rubber molding strips 65 and 66 in the door.

In Figs. 6 and 7 there is shown a form of the invention in which the molding 10 is structurally the same as heretofore described. Resilient pad 18a has a recess 68 formed in its lower side 26. In this long rectangular recess is removably inserted a long, rectangular resilient pad 70. This pad is formed with ribs or corrugations 72 on its lower side 74. The thickness of the pad 70 is greater than the depth of recess 68. By use of a pad 70 having any desired thickness it is possible to adapt the vibration damping device to different sizes and shapes of doors and door frames. Pad 70 is provided with holes 31 which will register with holes 16 and 30 for receiving screws 32 whereby the molding is secured in a door frame.

Molding 10 is preferably made of a light formable metal such as brass, aluminum, copper or the like. It may be provided in whatever lengths are required for any installation or it may be made in rather extended lengths which can be cut to desired size for any installation required. Pads 18, 18$^a$ and 70 can be economically manufactured by extrusion in extended lengths which can be cut to desired size to fit the molding 10.

The modified form of bumper construction of Figs. 8 and 9 differs from the form of construction of Figs. 1–5 in that the resilient pad 18$^b$ is formed with elongated spaced slots 75 extending transversely of the body of the pad at the points traversed by the screws 32$^b$ so that the pad may be moved toward and away from the flange 35$^b$ of the door 34$^b$. By reason of this construction, the pad may be moved so that its outermost edge projects beyond the molding 10$^b$ and plate 38$^b$ a distance sufficient to be engaged by the flange 35$^b$ of the door in order to cushion the door against vibration.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. A vibration damper and shock absorber for a door of a vehicle, comprising an elongated rigid strip formed by two walls perpendicularly disposed to each other to define a right-angled recess, and a resilient pad disposed in said recess, said pad being wedge shape in cross section with a maximum thickness at one end exceeding the interior width of one of said walls to provide a load bearing body resilient in compression to forces directed against the pad, opposite sides of said pad exceeding in width the interior width of the other of said walls, so that the thinner other end of the pad extends beyond a free edge of said other wall when said one end of the pad abuts said one wall in said recess to absorb forces of compression directed perpendicular to said other end of the pad, one of said sides being smooth and abutting said other wall, the other of said sides being ribbed to effect a frictional grip on a supporting surface, said other wall having countersunk holes and said pad having holes registering with the countersunk holes for receiving screws to secure the strip and pad to said supporting surface, said one wall having a tapered free edge for abutting another surface perpendicular to said supporting surface to resist said forces of compression, said other side having a rectangular recess, and an auxiliary resilient pad disposed in said rectangular recess, the thickness of said auxiliary pad exceeding the depth of said rectangular recess whereby auxiliary pads of different thicknesses may be installed in said recess for varying the operative position of the first-named resilient pad and strip.

2. A vibration damper and shock absorber for a door of a vehicle, comprising an elongated rigid strip formed by two walls perpendicularly disposed to each other to define a right-angled recess, and a resilient pad disposed in said recess, said pad being wedge shape in cross section with a maximum thickness at one end exceeding the interior width of one of said walls to provide a load bearing body resilient in compression to forces directed against the pad, opposite sides of said pad exceeding in width the interior width of the other of said walls, so that the thinner other end of the pad extends beyond a free edge of said other wall when said one end of the pad abuts said one wall in said recess to absorb forces of compression directed perpendicular to said other end of the pad, one of said sides being smooth and abutting said other wall, the other of said sides being ribbed to effect a frictional grip on a supporting surface, said other wall having countersunk holes and said pad having holes registering with the countersunk holes for receiving screws to secure the strip and pad to said supporting surface, said one wall having a tapered free edge for abutting another surface perpendicular to said supporting surface to resist said forces of compression, said other side having a rectangular recess, and an auxiliary resilient pad disposed in said rectangular recess, the thickness of said auxiliary pad exceeding the depth of said rectangular recess whereby auxiliary pads of different thicknesses may be installed in said recess for varying the operative position of the first-named resilient pad and strip, said auxiliary pad having an outer ribbed side.

References Cited in the file of this patent

UNITED STATES PATENTS

| Number | Name | Date |
|---|---|---|
| 868,200 | Lucas | Oct. 15, 1907 |
| 1,226,442 | Atwood | May 15, 1917 |
| 1,828,120 | Perry | Oct. 20, 1931 |
| 1,939,402 | Moser | Dec. 12, 1933 |
| 1,986,744 | Muxworthy | Jan. 1, 1935 |
| 2,715,242 | Smith | Aug. 16, 1955 |
| 2,764,787 | Lyon | Oct. 2, 1956 |